United States Patent [19]

Brown, Jr. et al.

[11] Patent Number: 5,557,720
[45] Date of Patent: Sep. 17, 1996

[54] METHOD OF DETERMINING WHETHER A DOCUMENT TREE IS WEAKLY VALID

[75] Inventors: Allen L. Brown, Jr., San Diego, Calif.; Sidney W. Marshall, Penfield, N.Y.

[73] Assignee: Xerox Corporation, Stamford, Conn.

[21] Appl. No.: 303,286

[22] Filed: Sep. 8, 1994

Related U.S. Application Data

[63] Continuation of Ser. No. 44,792, Apr. 12, 1993, abandoned.

[51] Int. Cl.⁶ .................................................. G06F 7/28
[52] U.S. Cl. .................................................. 395/146
[58] Field of Search .......................... 395/145, 146, 395/147, 148, 156, 159, 161; 364/419.01, 419.08, 419.09, 419.17

[56] References Cited

U.S. PATENT DOCUMENTS

| | | | |
|---|---|---|---|
| 4,429,372 | 1/1984 | Berry et al. | 395/149 X |
| 4,723,211 | 2/1988 | Barker et al. | 395/147 X |
| 4,831,541 | 5/1989 | Eshel | 395/146 X |
| 4,887,212 | 11/1989 | Zamora et al. | 364/419.08 X |
| 4,891,770 | 1/1990 | Hollett | 395/144 X |
| 4,905,185 | 2/1990 | Sakai | 395/146 X |
| 5,060,155 | 10/1991 | van Zuijlen | 364/419.08 X |
| 5,079,700 | 1/1992 | Kozoll et al. | 364/419.17 |
| 5,099,425 | 3/1992 | Yuji et al. | 364/419.08 X |
| 5,113,341 | 5/1992 | Kozol et al. | 364/419.1 |
| 5,130,924 | 7/1992 | Barker et al. | 364/419.1 X |
| 5,140,521 | 8/1992 | Kozol et al. | 364/419.1 |
| 5,179,650 | 1/1993 | Fukui et al. | 395/147 X |
| 5,185,698 | 2/1993 | Hesse et al. | 364/419.1 |
| 5,276,793 | 1/1994 | Borgendale et al. | 395/161 X |
| 5,293,473 | 3/1994 | Hesse et al. | 395/145 X |

OTHER PUBLICATIONS

McNaughton et al.; "Regular Expressions and State Graphs for Automata"; Sequential Machines—Selected Papers; Addison–Wesley Publishing Co. Inc., 1964; pp. 157–174.

*Primary Examiner*—Phu K. Nguyen
*Assistant Examiner*—Cliff N. Vo
*Attorney, Agent, or Firm*—Oliff & Berridge

[57] ABSTRACT

Some document languages such as the Standard Generalized Markup Language (SGML) represent documents as trees with each node of the tree labelled with a tag and each node's immediate descendants taken in order having tags that satisfy a production corresponding to the parent's tag. Thus, a document is represented as a complete parse tree satisfying the production rules of a grammar. To simplify maintaining a valid document/parse tree at all stages, an efficient check is made whether a document is valid or can be extended to a valid document and furthermore to show how a document could be changed to be valid. A document can be extended to a valid document if is equal to a valid document with possibly some nodes deleted. External (leaf) nodes can just be deleted. Internal nodes are deleted by replacing the arc from the parent with multiple arcs (in the same order) from the parent to each of the children of the deleted node. A grammar is constructed from the given grammar that includes those documents that can be completed to a valid document and is called a gapped grammar. A method is provided to teach how a gapped grammar can be constructed from a grammar, a parser/checker is efficiently implemented.

18 Claims, 10 Drawing Sheets

METHOD OF DETERMINING WHETHER A DOCUMENT TREE IS WEAKLY VALID

This is a continuation of application Ser. No. 08/044,792 filed Apr. 12, 1993, now abandoned.

FIELD OF THE INVENTION

The present invention relates to a method and apparatus for determining whether a labelled, ordered parse tree can be extended to a valid tree and, also, to a method and apparatus for determining whether or not a labelled, ordered parse tree can still be extended to a valid tree after at least one editing step.

BACKGROUND OF THE INVENTION

Documents can be described by internal computer structures in accordance with varying computer languages. For example, a document represented by one computer may use the Word Perfect language while a document represented by a different computer may use the Microsoft Word language. In order to make document processing more efficient, it is often desirable to enable interchange between documents represented using different languages. Thus, there should be consistency between interrelated documents.

In order to provide such consistency enabling interchange of documents, the Standard Generalized Markup Language (SGML) for example, was developed as an external representation making document interchange possible.

There are many editing applications wherein objects to be edited have hierarchical structures. Thus, any editing step must conform to a formal specification of possible content. The editing of documents described in SGML document type definitions is a specific instance of structured document editing.

Structured document editing has been deemed by many users as an excessively restrictive way of constructing structured objects (e.g., programs or documents) because of the strong ordering constraints (i.e., top-bottom, and sometimes left-right, as well) that grammar-based editors typically impose. Thus, a more relaxed version of syntax-directed editing is desirable. Often the class of hierarchical structures of interest can be made to correspond to incomplete parse trees of a particular context-free grammar (set of rules), i.e., any tree remaining after having deleted zero or more proper subtrees of a parse tree of the same grammar.

For example, given the following grammar, it would be desirable to easily and efficiently determine whether a user could freely build a hierarchical structure;

Doc→(Front, Body, Back)

Body→(Intro, Mn. Sections$^+$, App.$^+$)

Figure 1:
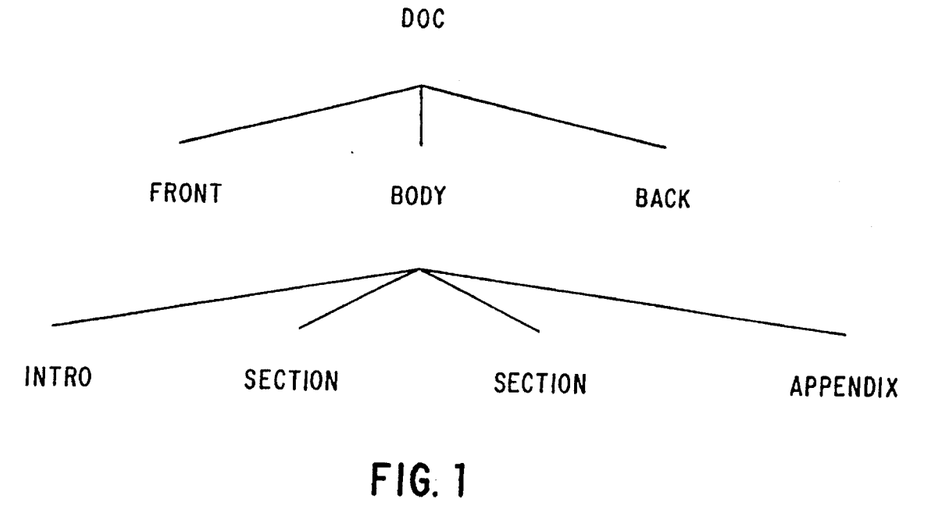
FIG. 1 is an exemplary parse tree corresponding to given grammar.

A parse tree corresponding to the above grammar is illustrated in FIG. 1.

Figure 2:
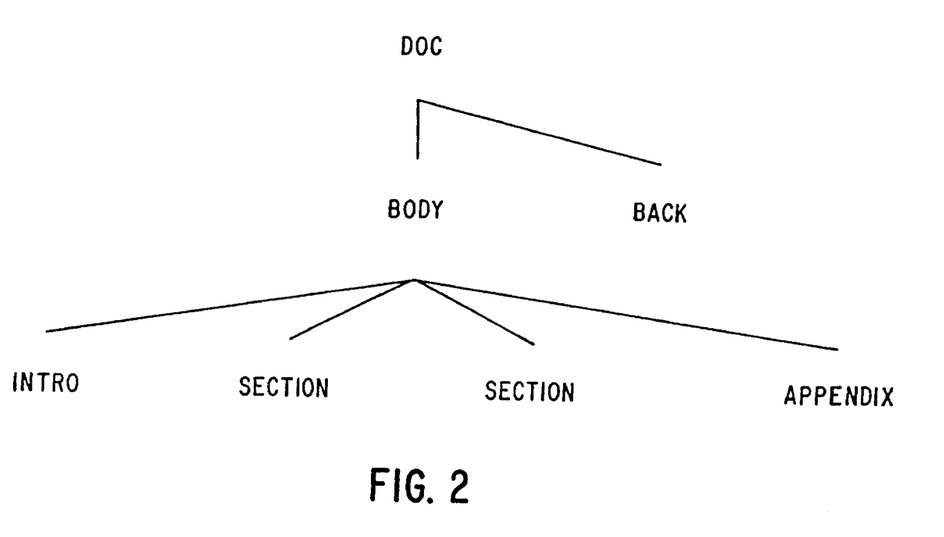
FIG. 2 illustrates an example of a horizontally gapped parse tree.
Figure 3:
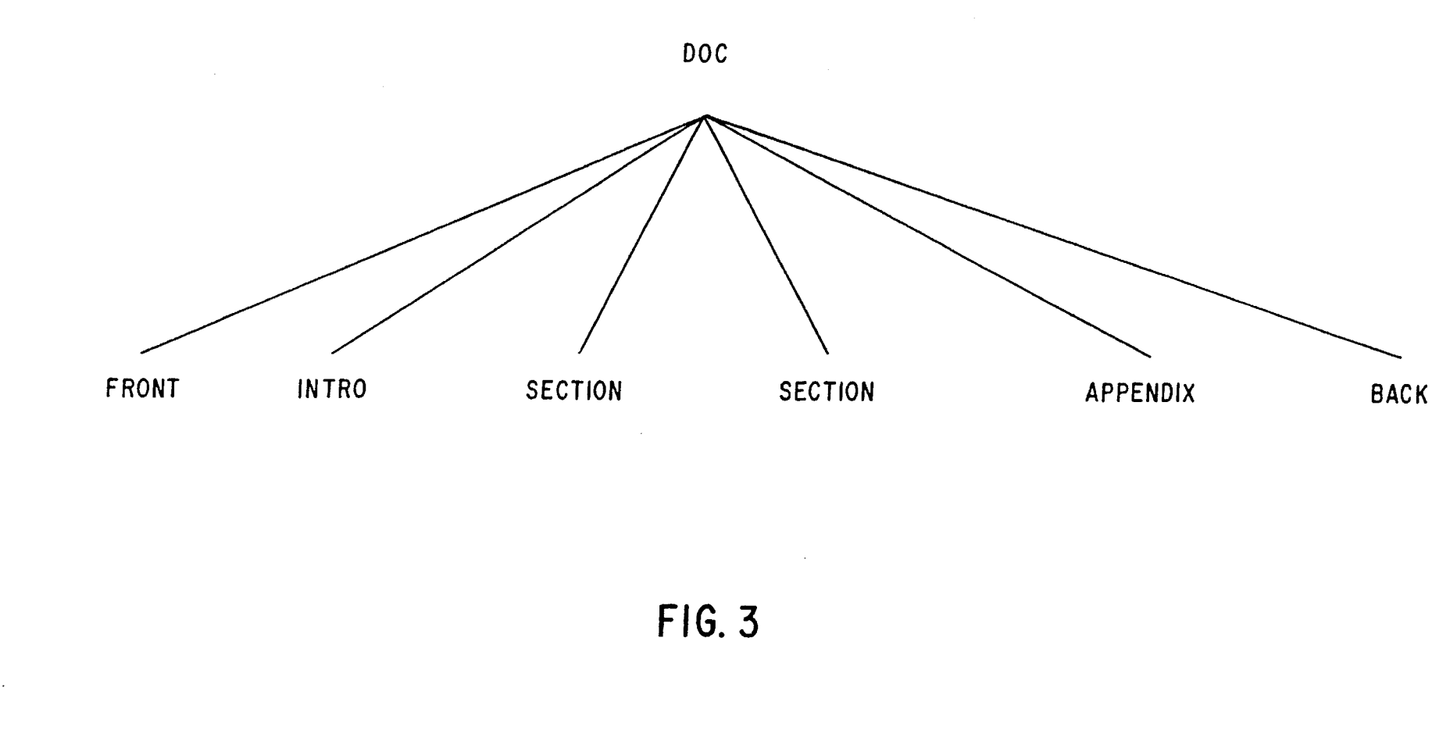
FIG. 3 illustrates an example of a vertically gapped parse tree.
Figure 4:
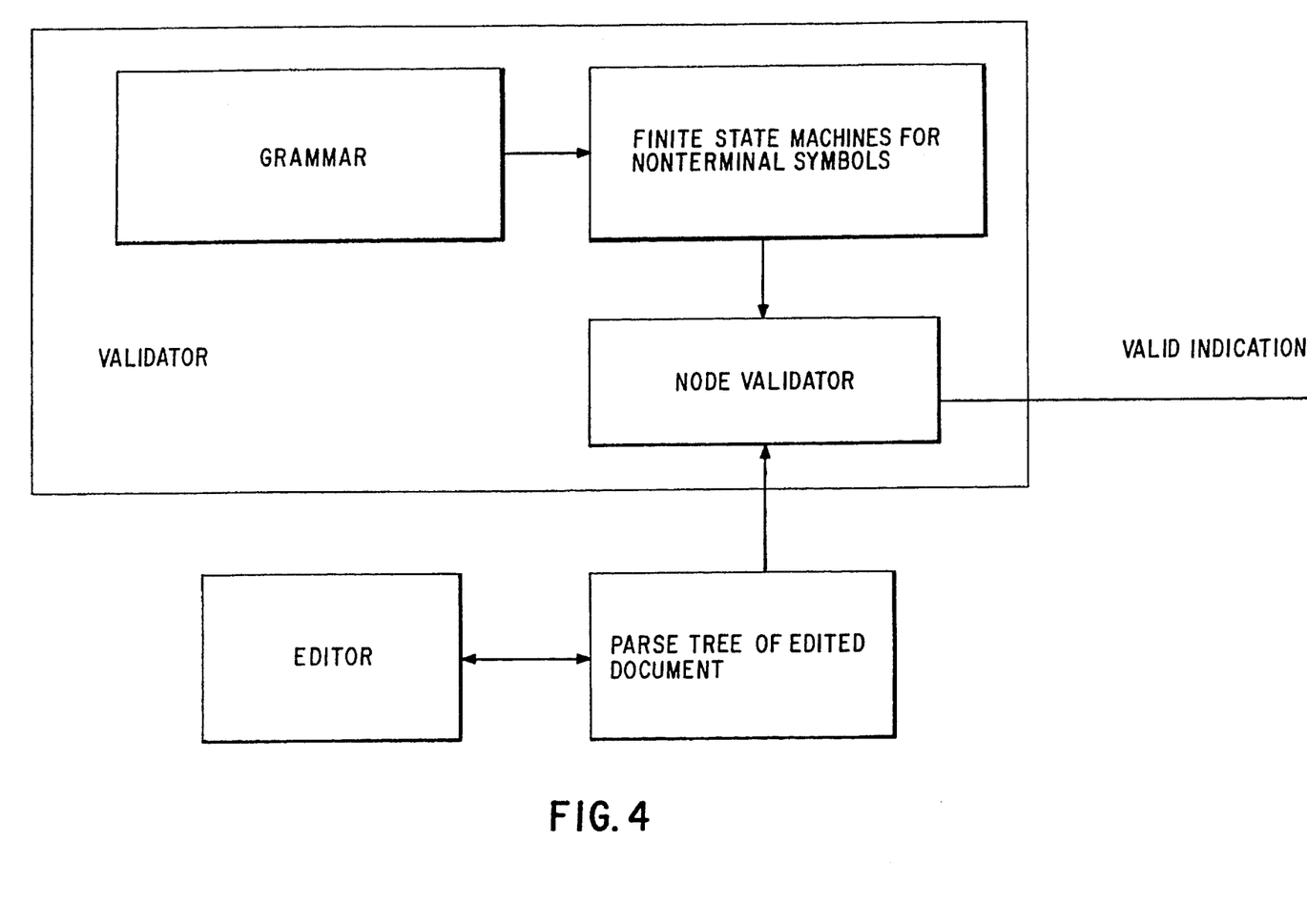
FIG. 4 is a block diagram of an editing apparatus in accordance with the present invention.

An SGML document class is defined by a document type definition or DTD (context-free grammar). In accordance with SGML, a document is classified as weakly valid if it can be made valid solely by the insertion of additional structural mark-up in appropriate places. For example, if "Front" was missing from the parse tree of FIG. 1 as shown in FIG. 2, the document would be classified as weakly valid since the simple insertion of "Front" would validate the parse tree. Similarly, if "Body" was missing from the parse tree of FIG. 1 as in FIG. 3, the document would also be classified as weakly valid since the insertion of begin and end tags around the [Intro, Sections$^+$, Appendix] would result in a valid parse tree. A document is valid if and only if the structure is a member of language defined by the DTD.

Thus, if, for example, a user wanted to add a node "x" beneath node "Body", it would be highly desirable to enable one to easily check for validity of this action, thus determining whether the action is legalized if some action can be taken. It is further desirable to perform such a check in an arbitrary, convenient order to enable the user to freely work on document segments.

SUMMARY OF THE INVENTION

The method and apparatus of the present invention determines whether or not an SGML document is valid after at least one editing step. In addition, if the resulting document is weakly valid but not valid, then a possible completion of the document is indicated that will make the document valid. In accordance with the present invention, the document is checked to see whether components are thus far legal according to structure compatibility. If any component is determined to not be legal, the method and parsing/editing apparatus of the present invention look at the point of failure and determine what could be done to render the document legal.

BRIEF DESCRIPTION OF THE DRAWINGS

The invention will be described in detail with reference to the following figures, wherein.

DETAILED DESCRIPTION OF PREFERRED EMBODIMENT

The use of document rules to form a document can be illustrated in the form of a parse tree, the parse tree having nodes labelled with symbols of the document rules (grammar productions). When the document is edited, the location of arcs and nodes of the original parse tree change. The method and apparatus of the present invention enable rapid validation of the newly created parse tree as described herein below.

For a context-free grammar $G=<V, \Sigma, S, P>$, where V is the set of symbols (both terminal and non-terminal) of the grammar (nodes), $\Sigma$ is the set of terminal symbols of the grammar, S is the start symbol of the grammar and P is the set of productions of the grammar with general regular expressions permitted for right-hand-sides of productions, T is assumed to be a parse tree of grammar G. A further assumption is made that the only productions of G having terminal symbols are of the form A→a, wherein a is a terminal symbol.

For example, let the grammar be <V, Σ, S, P> with:
v={A,B,C,D,E,F,G,H,P,Q,R,S,T,U,V,W,X,Y,Z,p,q,r,s,t,u,v,w,x,y,z}
Σ={p,q,r,s,t,u,v,w,x,y,z}
S=H
P=
{
H→A B C
A→(D A E A F) | P
B→(X G Y) | Q
C→Z
D→W
E→V
F→U
G→(T B S) | R
P→p
Q→q
R→r
S→s
T→t
U→u
V→v
W→w
X→x
Y→y
Z→z
}

Figure 5:
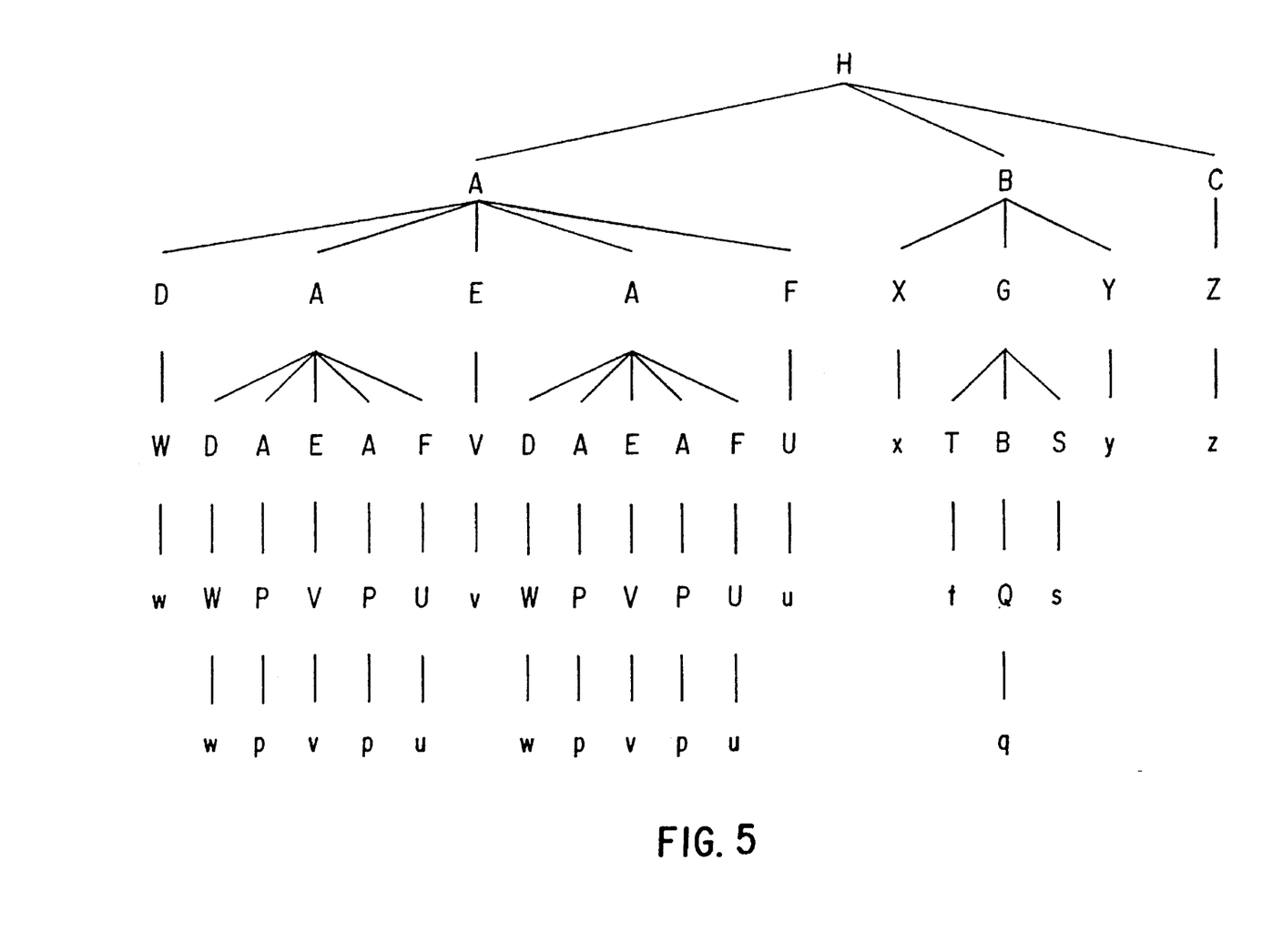
FIG. 5 is an exemplary parse tree corresponding to an example grammar.

A typical parse tree T for this grammar is in FIG. 5.

Figure 6:
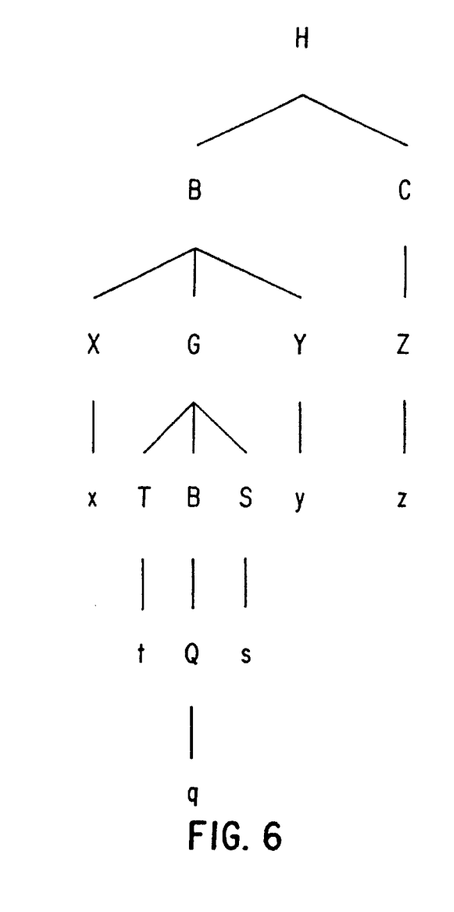
FIG. 6 is an exemplary horizontally gapped parse tree corresponding to an example grammar.

Upon editing, the parse tree T corresponding to grammar G becomes parse tree T', an ordered, labelled parse tree, having nodes labelled with elements of V, the root node of parse tree T' being labelled with S. An edited structured document can have a corresponding parse tree which is "gapped". A gapped parse tree can be in the form of a horizontally gapped tree or a vertically gapped tree. FIG. 6 illustrates an example of a horizontal gapped tree, the gap being created with the deletion of the entire subtree rooted in the topmost "A".

Figure 7:
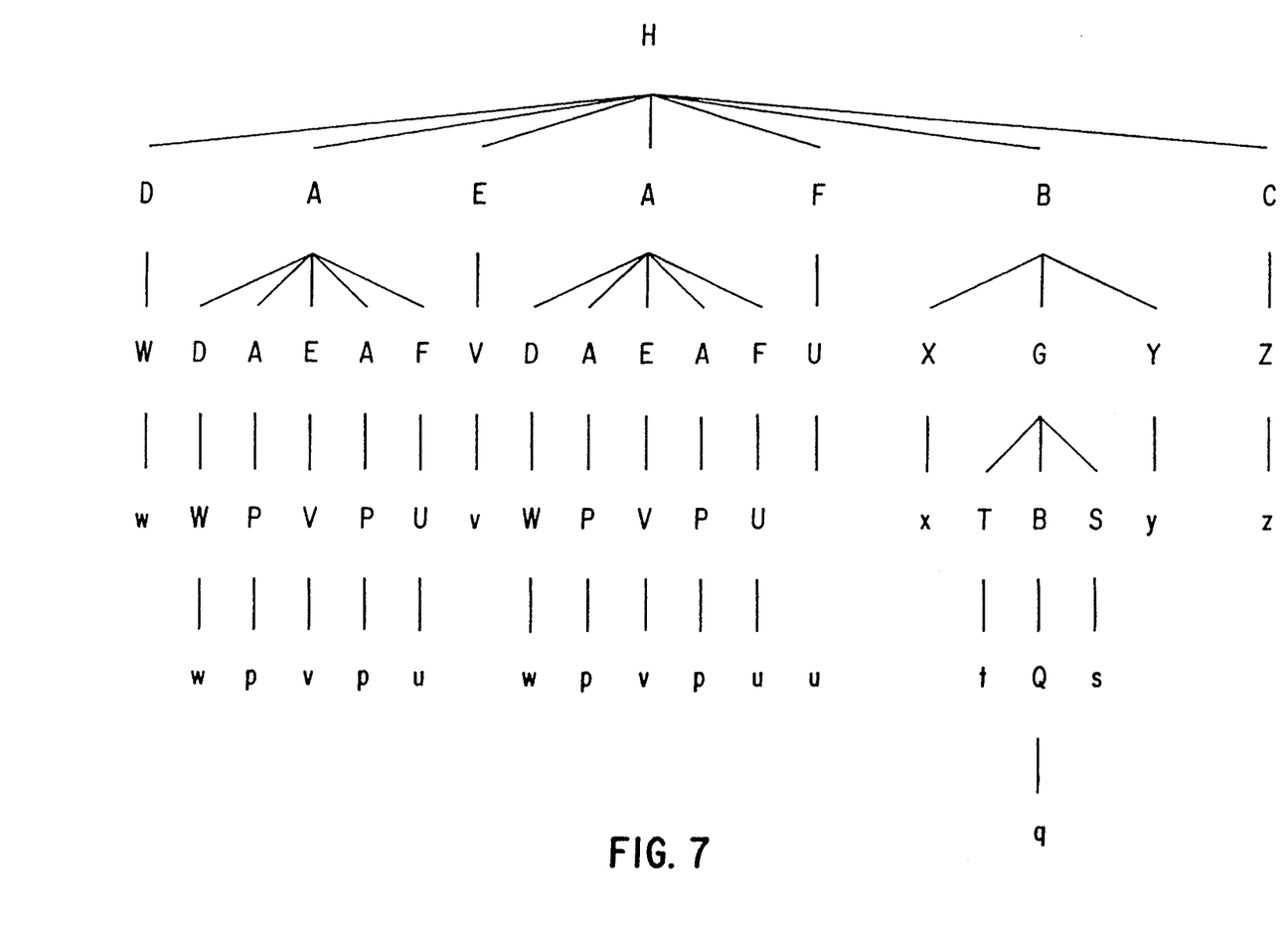
FIG. 7 is an exemplary vertically gapped parse tree corresponding to an example grammar.

FIG. 7 illustrates a vertically gapped tree, the vertical gap being created with the deletion of the topmost "A" and putting its children in its place.

The ordered, labelled tree T' is a gapped tree of G if and only if there is a one-to-one mapping of the subtrees of T' into subtrees of a T such that any subtree of T' is mapped to a subtree of T having the same label on its root, and the mapping preserves the horizontal and vertical ordering of nodes as the nodes appeared in tree T' and T is a valid parse tree of G.

A piecewise-structured editor for grammar G enables the transformation of one gapped tree of G into another such tree. While a gapped tree may not be a complete parse tree of G, the gapped tree can be made a complete parse tree purely by the insertion of new nodes and arcs in the tree. Hence, various "gaps" in T' can be "filled" to yield a valid parse tree T. Thus, the editing is piecewise, as the user is permitted to create any gapped tree T' via insertions/deletions of arcs and nodes. In order to make a piecewise-structured editing plausible, it must be efficiently determinable that a parse tree T' is a gapped tree of G. The method and apparatus of the present invention make this determination.

For example, given the example grammar, the complete parse tree illustrated in FIG. 5 could result.

The following definitions are provided as background of the present invention.

Definition 1

A gap grammar is a context-free grammar G=<V, Σ, S, P> such that for every A contained in V–Σ (nonterminal symbols), A→ empty is contained in P, where empty (ε) is the empty string. This captures the idea of a horizontally-gapped tree.

Thus, for the preceeding example grammar, the following productions must be added to make it a gap grammar:
H→ε
A→ε
B→ε
C→ε
D→ε
E→ε
F→ε
G→ε
P→ε
Q→ε
R→ε
S→ε
T→ε
U→ε
V→ε
W→ε
X→ε
Y→ε
Z→ε

Definition 2 axb→adb if there is a production x→y in G having d as a possible string in the language defined by the regular expression y. a→* b if either a=b or there is a c such that a→c and c→* b.

Definition 3

The reachability graph of the context-free grammar G=<V, Σ, S, P> is a directed graph whose set of nodes is V and whose arcs are the set of all ordered pairs <x, y> such that x,y are in V and x→ayb is in P. For symbols x,y in V, y is said to be reachable from x if there is a directed path from x to y of one or more arcs. This definition defines whether one node (e.g., y) is reachable from another node (e.g., x).

Figure 8:
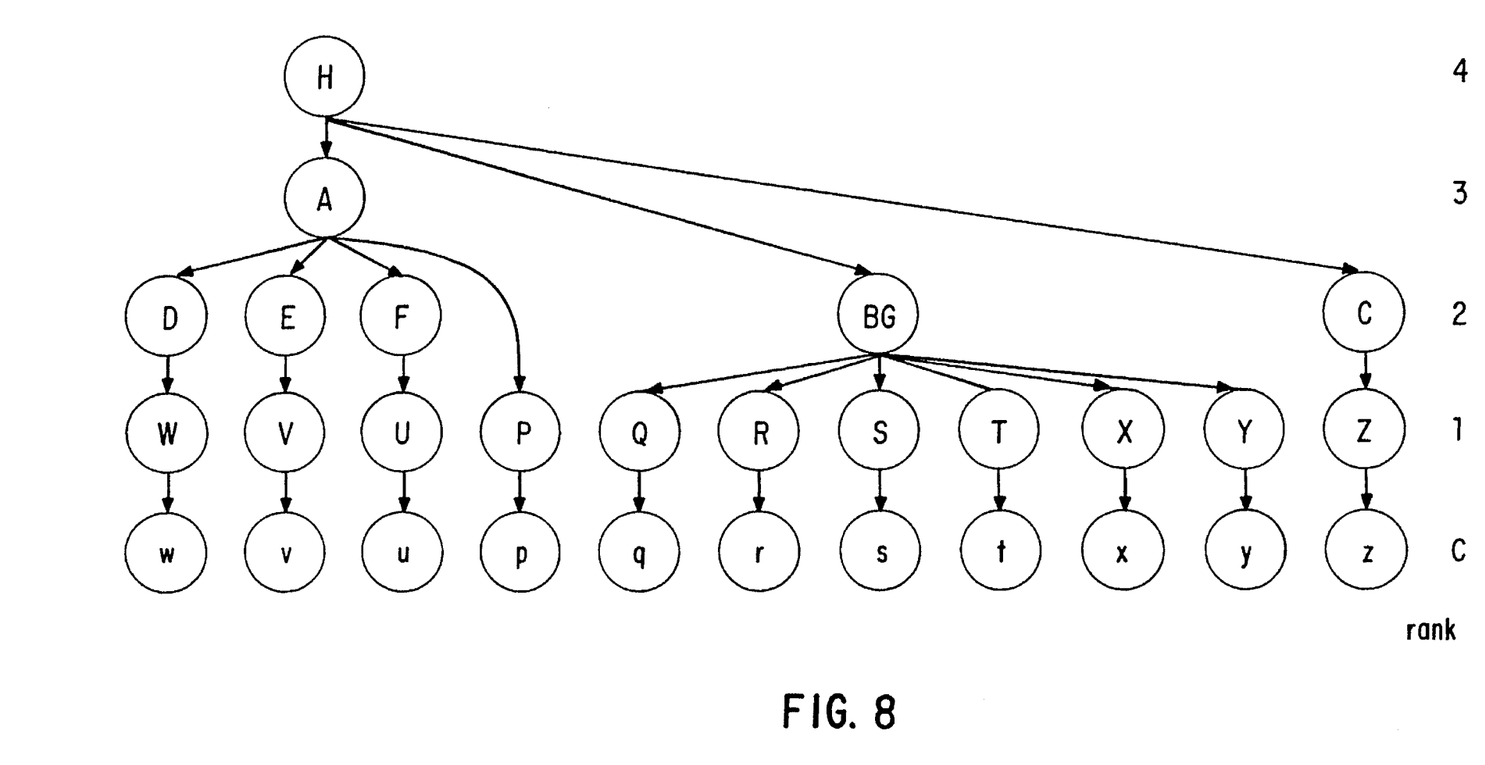
FIG. 8 is a reachability graph with strongly connected components and ranks indicated for an example grammar.

The reachability graph for the example grammar is shown in FIG. 8.

TABLE OF REACHABILITY FOR EXAMPLE GRAMMAR:

H can reach A B C D E F G P p Q q R r S s T t U u V v W w X x Y y Z z
A can reach A D E F P p U u V v W w
B can reach B G Q q R r S s T t X x Y y
C can reach Z z
D can reach W w
E can reach V v
F can reach U u
G can reach B G Q q R r S s T t X x Y y
P can reach p
Q can reach q
R can reach r
S can reach s
T can reach t
U can reach u
V can reach v
W can reach w
X can reach x
Y can reach y
Z can reach z Definition 4

A strongly connected component of the reachability graph of $G=<V, \Sigma, S, P>$ is a set of nodes in the reachability graph of G with the property that all nodes in the set are reachable from all other nodes of the set, and no node of the set is reachable from any node not in the set that is reachable from some node in the set.

Consider the partition of the reachability graph of $G=<V, \Sigma, S, P>$ into strongly connected components as illustrated in FIG. 8, for the example grammar. In FIG. 8, a set of regions are illustrated wherein a node located in one region goes to a node in another region when the two nodes are connected by an arrow.

A strongly connected component having no outgoing (labelled) arcs has rank 0. A strongly connected component U having outgoing arcs has a rank one greater than that of the maximum of the ranks of the strongly connected components to which U is connected by outgoing arcs (from U). The rank of x in V is the rank of the strongly connected component in which x is found. FIG. 8 also labels the ranks of the strongly connected components.

Definition 5

A symbol x in V of a context-free grammar $G=<V, \Sigma, S, P>$ is recursive if and only if it is reachable from itself. A recursive symbol S is multiply-recursive if there exists a production in P from a symbol R in the strongly connected component containing S that can produce more than one instance of any symbol in the strongly connected component containing S. A recursive symbol that is not multiply-recursive is singly-recursive.

In the example grammar, A is multiply recursive and B and G are singly-recursive. All other symbols are not recursive.

Definition 6

Let x be a symbol of the context-free grammar $G=<V, \Sigma, S, P>$. We associate with every symbol x a regular expression called gap(x). We inductively define the regular expression gap(x) as follows:

1. If x in $\Sigma$ is a terminal symbol (of rank 0), gap(x)=(x).
2. If x in V-$\Sigma$ is a non-recursive symbol of rank 0, gap(x)=($\epsilon$|x).
3. If x in V is a non-recursive symbol of nonzero rank, gap(x)=($\epsilon$|x|R1|R2 . . . ) where R1, R2 . . . are the right-hand-sides of productions for x with gap(w) substituted for each symbol w in the production.
4. If x in V is a multiply-recursive symbol, gap(x)= (x|S1|S2 . . . )* where S1, S2 . . . is the complete set of symbols reachable from x.
5. Let x in V be a singly-recursive symbol of G. Construct the sets of regular expressions L, M, and R as follows:

Define SPLIT(exp) as:

If SPLIT(exp) has already been evaluated for the same exp then return.

Otherwise, if exp does not contain any symbol in the same strongly connected component as x then add exp with gap(w) substituted for each symbol w in exp to the set M;

Otherwise, if exp is a symbol, then it must be in the same strongly connected component as x so do nothing.

Otherwise, if the top-level operator in exp is * (or STAR), then there is an error as x could not possibly be singly-recursive.

Otherwise, if the top-level operator in exp is | (or OR), then call SPLIT(alt) where alt is each of the alternatives of | (or OR) in turn.

Otherwise, if the top-level operator in exp is CONCAT-ENATE (juxtaposition), then there must exactly one term of the CONCATENATE that contains a symbol that is in the strongly connected component containing x. Add all of the symbols in terms to the left of this term to the set L; Add all of the symbols in terms to the right of this term to the set R; Call SPLIT(term) with the term containing a symbol that is in the strongly connected component containing x.

Otherwise, if the top level operator is + (or PLUS), then there is an error as x could not possibly be singly-recursive.

Otherwise, if the top level operator is ? (or OPTIONAL), rewrite the expression using OR and EMPTY (e.g., x? rewrites to ($\epsilon$|x) ). Then call SPLIT on the resulting expression.

End of definition for SPLIT.

Initialize L, M, and R to be empty sets;

Call SPLIT(RHS) for every production for x in G where RHS is the right hand side of the production;

Then left(x)=(L1 | L2 | . . . ) where L1, L2 . . . is the set of all symbols appearing in the set L or reachable from a symbol in the set L; middle(x)=($\epsilon$|S1 |S2 . . . | M1 | M2 | . . . ) where S1, S2 . . . are the symbols in the strongly connected component containing x, M1, M2 is the set of regular expressions in the set M; right(x)=(R1 | R2 | . . . ) where R1, R2 . . . is the set of all symbols appearing in the set R or reachable from a symbol in the set R. Then gap(x)=(left(x))* middle(x) (right(x))*.

For the example grammar, SPLIT(B) will construct the following sets:

L={T,X}
M={gap(Q),gap(R)}
R={S,Y} and
left(B)=(T|t|X|x)
middle(B)=($\epsilon$|B|G|gap(Q)|gap(R))=($\epsilon$|B|G|Q|q|R|r)
right(B)=(S|s|Y|y)

The value of gap(x) for all of the nonterminals in the example grammar are:

gap(H)=($\epsilon$|H|gap(A)gap(B)gap(C))
gap(A)=(A|D|E|F|P|U|V|W|p|u|v|w)*
gap(B)=((T|t|X|x)*($\epsilon$|B|G[<b]old51 gap(Q)gap(R))(S|s|Y|y)*)
gap(C)=($\epsilon$|C|gap(Z))
gap(D)=($\epsilon$|D|gap(W))
gap(E)=($\epsilon$|E|gap(V))
gap(F)=($\epsilon$|F|gap(U))
gap(G)=((T|t|X|x)*($\epsilon$|B|G|gap(Q)|gap(R))(S|s|Y|y)*)
gap(P)=($\epsilon$|P|gap(p))
gap(Q)=($\epsilon$|Q|gap(q))
gap(R)=($\epsilon$|R|gap(r))
gap(S)=($\epsilon$|S|gap(s))
gap(T)=($\epsilon$|T|gap(t))
gap(U)=($\epsilon$|U|gap(u))
gap(V)=($\epsilon$|V|gap(v))
gap(W)=($\epsilon$|W|gap(w))
gap(X)=($\epsilon$|X|gap(x))
gap(Y)=($\epsilon$|Y|gap(y))
gap(Z)=($\epsilon$|Z|gap(z))

Figure 10:
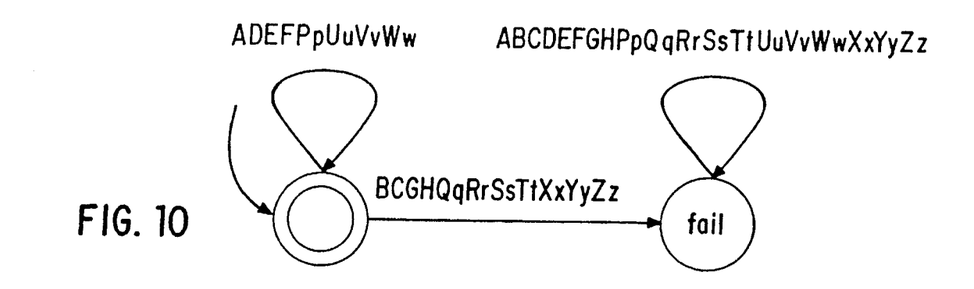
Figure 11:
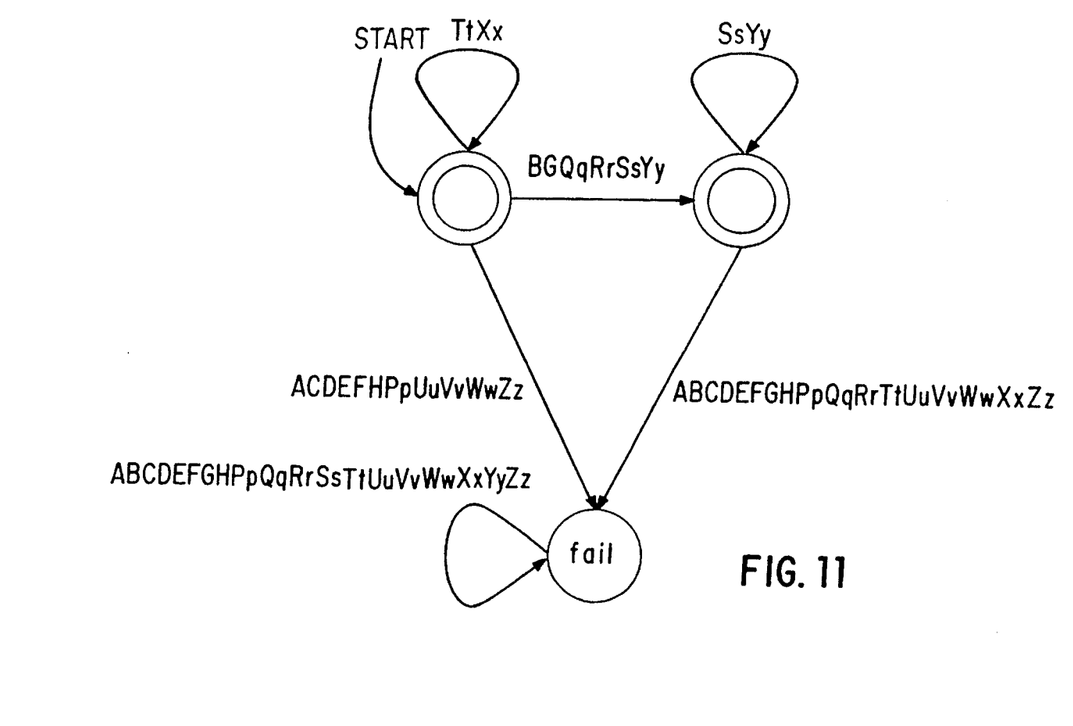
Figure 12:
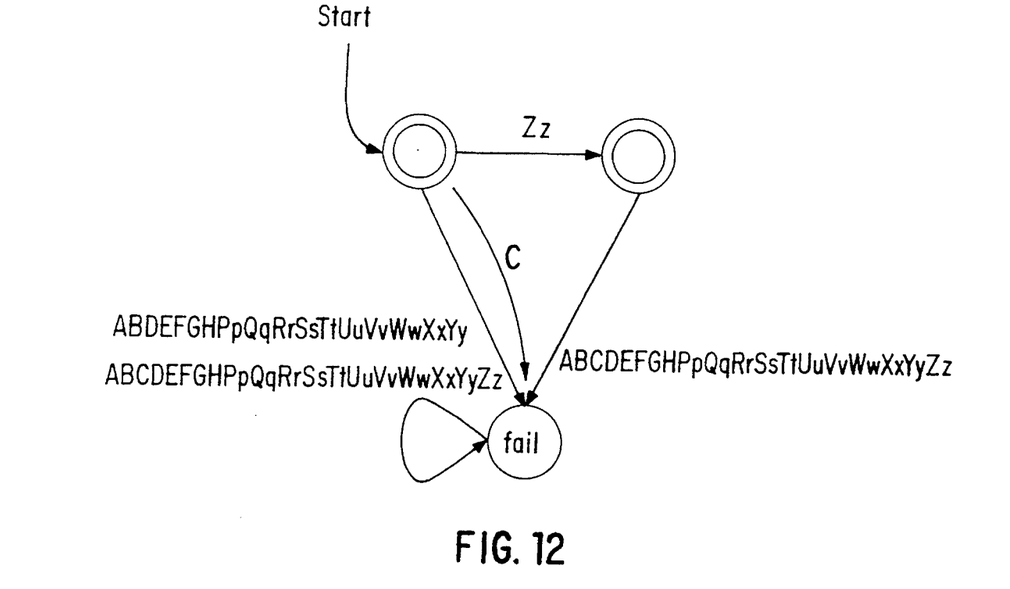
Figure 13:
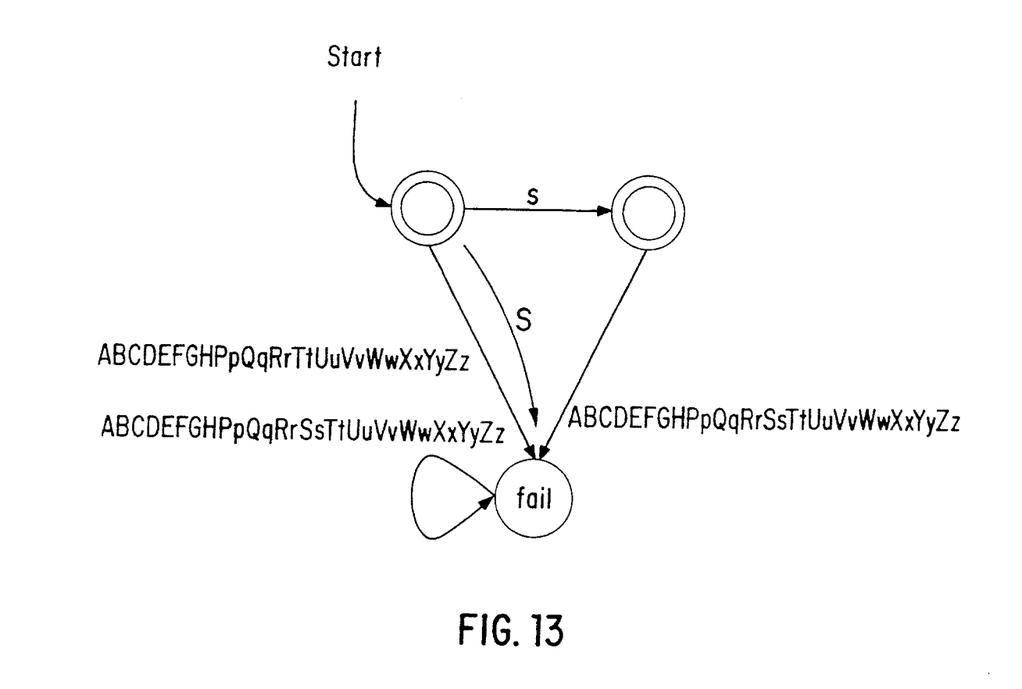

The value of gap(x) expanded and simplified:

gap(H)= ($\epsilon$|H|(A|D|E|F|P|U|V|W|p|u|v|w)*(T|t|X|x|)*($\epsilon$|B|G|Q|q|R|r)(S|s|Y|y)*(
gap(A)=(A|D|E|F|P|U|V|W|p|u|v|w)*
gap(B)=(T|t|X|x)*($\epsilon$|B|G|Q|q|R|r)(S|s|Y|y)*
gap(C)=$\epsilon$|C|Z|z
gap(D)=$\epsilon$|D|W|w
gap(E)=$\epsilon$|E|V|v
gap(F)=$\epsilon$|F|U|u
gap(G)=(T|t|X|x)*($\epsilon$|B|G|Q|q|R|r)(S|s|Y|y)*
gap(P)=$\epsilon$|P|p
gap(Q)=$\epsilon$|Q|q gap(R)=ϵ|R|r
gap(S)=ϵ|S|s
gap(T)=ϵ|T|t
gap(U)=ϵ|U|u
gap(V)=ϵ|V|v
gap(W)=ϵ|W|w
gap(X)=ϵ|X|x
gap(Y)=ϵ|Y|y
gap(Z)=ϵ|Z|z As is well-known, a finite-state machine can be constructed for any regular expression that efficiently checks whether or not a given string is a member of the language defined by the regular expression [see paper by R. McNaughton and H. Yamada, "Regular Expressions and State Graphs for Automata" in Sequential Machines: Selected Papers, Addison Wesley, 1964]. An exemplary finite state machine for recognizing weakly valid children of node H is in FIG. 9, A in FIG. 10, B in FIG. 11, C in FIG. 12, and S in FIG. 13. In these diagrams, accept states are shown as double circles while fail states are shown as single circles. Theorem 1

Let $G=<V, \Sigma, S, P>$ be a gap grammar, A in $V-\Sigma$ and a in $V^*$. $A \rightarrow^* a$ if and only if a is in gap(A).

In accordance with the present invention, the editor enables determination of whether tree T' is valid.

In a first embodiment, the validity of the entire tree is checked by the editor in accordance with the following:

Let R be a regular expression. It is well-known that the strings of a language defined by a regular expression can be recognized in deterministic time of the order of the string length. Thus, given a regular expression R, a procedure recognize(R) is compiled which is parameterized by strings (ordered lists of symbols in V) S that return true if and only if S is in R where recognize(R) runs in deterministic time of order length(S). By virtue of the previous theorem, the deterministic procedure below returns true if and only if T' is a gapped tree of G. Moreover, it runs in time linear in the size of the tree (gapped or not).

For each node labelled A in T' with immediate descendant nodes labelled B1, . . . ,Bk do If recognize ($R_1|R_2 \ldots$) ($B_1, \ldots, B_k$), where $R_1, R_2 \ldots$ are the right-hand-sides of productions for A with gap(w) substituted for each symbol w in the right-hand-sides for A, then true else return(false)

Return(true)

A may have no immediate descendants, e.g., B1, . . . ,Bk=ϵ.

The finite state machines constructed by methods taught by the present invention determine whether or not the sub-structures of a document fed them as input can comprise an instance of a parse tree of a gap grammar. The names of the children of each and every nonterminal node (in order, as a string) must be accepted by the finite state machine named the parent node for the tree to be an instance of a parse tree of a gap grammar. If this condition holds, then the parse tree is that of a weakly valid document, otherwise, it is the parse tree of neither a valid nor weakly valid document.

In accordance with another embodiment of the invention, the editor needs only check certain subtrees of tree T' created by the insertion or deletion of nodes and arcs in tree T. In this embodiment, for an inserted node, only the parent of a newly inserted node with its new children and the newly inserted node and its children are checked. For a deleted node, only the parent of a newly deleted node with its new children are checked. This alternative procedure is performed in accordance with the following:

parent(node) takes a node as a parameter and returns its parent node in the tree T';

childnames(node) takes a node as a parameter and returns the ordered list of child labels below the node in the tree T';

fsm(node) takes a node as a parameter and returns the finite-state machine (regular expression) corresponding to the regular expression ($R_1|R_2 \ldots$) where $R_1, R_2 \ldots$ are the right-hand-sides of productions for the label of that node with gap(w) substituted for each symbol w in the right-hand-sides;

For each new node n in T' do

If not(recognize(fsm(parent(n)))(childnames(parent(n)))) then return false

If not(recognize(fsm(n))(childnames(n))) then return false

For each parent node n (that still exists) of a deleted node in T' do

If not(recognize(fsm(n))(childnames(n))) then return false Return true.

The latter procedure runs in time proportional to the sum of the number of nodes below the old parents of inserted nodes and the number of nodes below the parents of deleted nodes.

Figure 9:
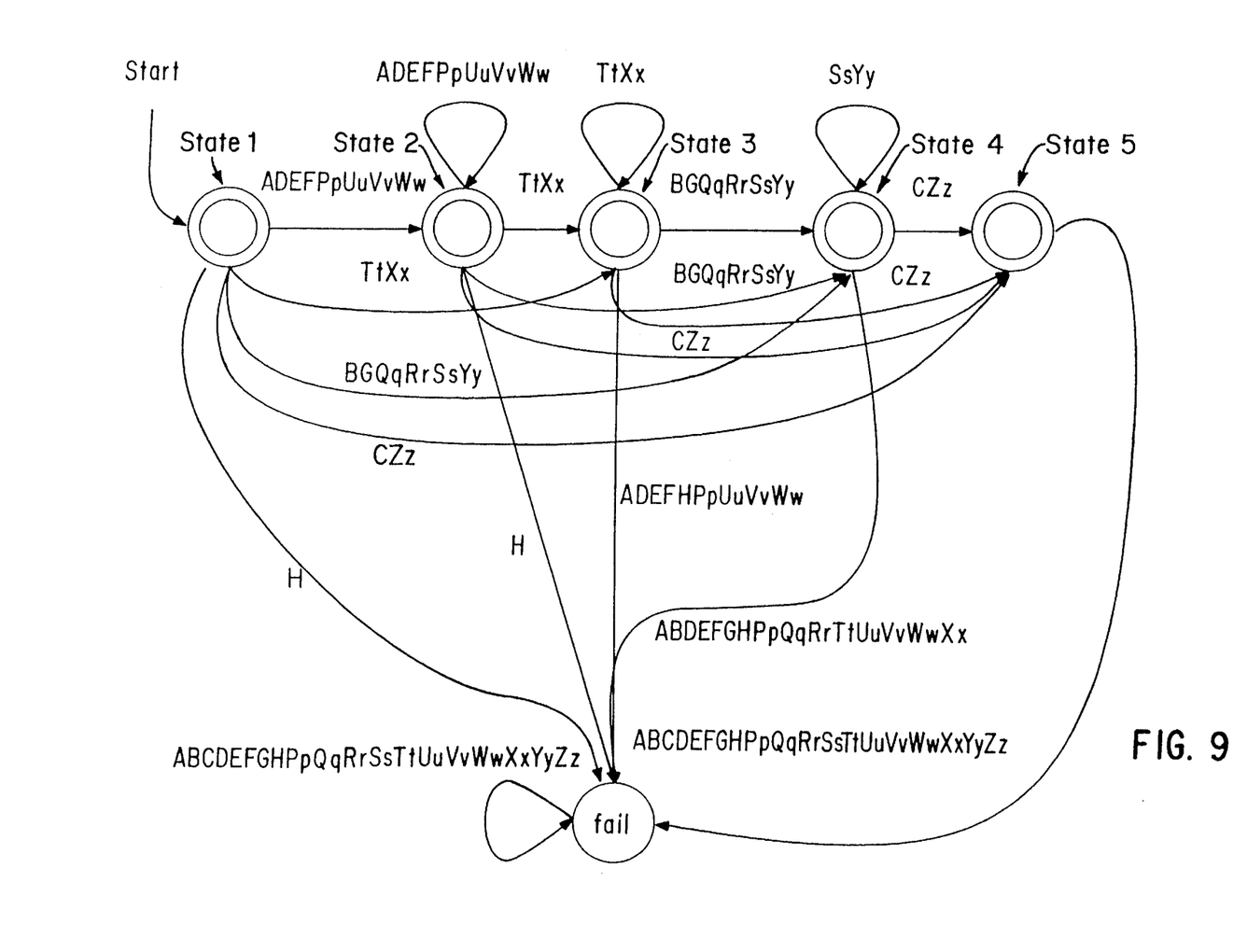
FIGS. 9–13 are exemplary finite state machines useful for weakly validating a parse tree for an example grammar.

For example, to check if the nodes below the node "H" of the tree in FIG. 7 are allowed in the parse tree of a weakly valid document, the labels of the children "DAEAFBC" are formed into a string and attempted to be recognized by the finite state machine labelled by H in FIG. 9. Starting in state 1 the machine will make the following transitions for the given string:

state 1 scans D resulting in state 2 scans A resulting in state 2 scans E resulting in state 2 scans A resulting in state 2 scans F resulting in state 2 scans B resulting in state 4 scans C resulting in state 5.

Since state 5 is marked as an accept state (double circle) the sequence of children is possible in a parse tree of a weakly valid document.

Accordingly, the editor/parser of the present invention enables efficient determination of whether a given labelled, ordered tree can be extended to be a parse tree of given context-free grammar. The editor/parser can be a programmed computer which determines whether a given parse tree can be extended to a valid parse tree. The determination can be made either in time linear to the number of nodes in the newly created tree or can be modified to make the determination in time linear to the size of only the changed portion of the parse tree.

While this invention has been described in conjunction with specific embodiments thereof, it is evident that many alternatives, modifications and variations will be apparent to those skilled in the art. For example, while the method and apparatus are described in conjunction with the SGML grammar-based specification, the present invention could be applied to any document representation described by a formal context-free grammar-based specification, such as open document architecture (ODA). Accordingly, the preferred embodiments of the invention as set forth herein are intended to be illustrative, not limiting. Various changes may be made without departing from the spirit and scope of the invention as defined in the following claims.

What is claimed is:

1. A method for determining whether an editing step of a document tree results in a weakly valid document structure, the weakly valid document structure being a document structure that is extendable into a valid document structure that satisfies a grammar, the method comprising the steps of:

produce the document tree having a plurality of nodes labelled with symbols of the grammar;

examining selective nodes of the document tree to determine whether the selective nodes are weakly valid to extend into the valid document structure that satisfies the grammar; and performing the editing step to obtain the weakly valid document structure if the selective nodes are determined to be weakly valid.

2. The method according to claim 1, further comprising determining whether a plurality of editing steps result in the weakly valid document structure.

3. The method according to claim 1, wherein the document tree is defined by a structured language, said method further comprising determining whether the document tree is extendable into the valid document structure by insertion of additional structural language in appropriate places.

4. The method according to claim 1, wherein a plurality of editing steps are performed in any desirable order.

5. The method according to claim 1, wherein said examining step comprises checking each node of the document tree.

6. The method according to claim 5, wherein said examining step comprises:

checking, for each node in the document tree, whether descendants of the node are extendable into a legal sequence of descendants.

7. The method according to claim 6, wherein each node is checked to determine whether the node matches a corresponding gap grammar.

8. The method according to claim 7, wherein each gap grammar is represented by a corresponding finite state machine.

9. The method according to claim 8, wherein the document tree is determined to be weakly valid when names of children of each nonterminal node are accepted by the corresponding finite state machine of each nonterminal node.

10. The method according to claim 1, wherein only certain subtrees of the document tree are examined.

11. The method according to claim 10, wherein said subtrees comprise a parent, siblings and children of a particular newly inserted node.

12. The method according to claim 10, wherein said subtrees comprise a parent and new children of the parent of a particular newly deleted node.

13. The method according to claim 10, wherein said examining step comprises checking, for each new node in the document tree, whether descendants of the new node satisfy a corresponding gap grammar; and checking, for each parent node of a deleted or inserted node, whether descendants of the parent node satisfy the corresponding gap grammar.

14. A method of determining whether a given document tree is a weakly-valid document tree of a given grammar, the weakly valid document tree being a document tree that is extendable into a valid document tree that satisfies the given grammar with only an insertion of additional nodes, the method comprising the steps of:

constructing gap regular expressions for each nonterminal node of the given grammar; and checking each nonterminal node of the given document tree for children whose names form a string in a language of the corresponding gap regular expression to determine if the given document tree is a weakly-valid document tree that can be extended into the valid document tree that satisfies the grammar.

15. The method according to claim 14, wherein each gap regular expression is represented by a corresponding finite state machine.

16. An editing method for determining whether an editing step of a document tree results in a weakly-valid document tree, the document tree having nodes labelled with symbols of grammar of the document tree, the weakly valid document tree being a document tree that is extendable into a valid document tree that satisfies the given grammar by additional structural changes, the method comprising the steps of:

constructing gap regular expressions for each nonterminal node of the grammar; and checking each nonterminal node of the document tree for children whose names form a string in a language of the corresponding gap regular expression to determine if the document tree is a weakly-valid document tree that can be extended into the valid document tree that satisfies the grammar.

17. The editing method according to claim 16, wherein the gap regular expressions are represented by finite state machines.

18. The method according to claim 1, wherein the selective nodes are nodes having subchildren that have been changed in the editing step.

* * * * *